United States Patent [19]
Steiner George A.

[11] Patent Number: 5,299,456
[45] Date of Patent: Apr. 5, 1994

[54] ELECTRONIC DIPSTICK FOR INDICATING THE OIL LEVEL OF AN ENGINE

[76] Inventor: Steiner George A., 4425 Harvard Avenue, Montreal, Quebec, Canada, H4A 2W9

[21] Appl. No.: 906,810

[22] Filed: Jun. 30, 1992

[51] Int. Cl.⁵ .................. G01F 23/72; G01F 23/76
[52] U.S. Cl. ........................... 73/308; 73/313; 73/319; 73/DIG. 5; 73/311; 73/222.5; 340/624; 340/450.3; 33/722; 184/108; 123/196 S
[58] Field of Search .............. 340/450.3, 624; 73/DIG. 5, 313, 319, 308, 311, 322.5; 123/196 S; 184/108; 33/722, 723, 724, 725, 726, 727, 728, 729, 730, 731, 354

[56] References Cited

U.S. PATENT DOCUMENTS

| | | | |
|---|---|---|---|
| 2,780,692 | 2/1957 | Hinojosa | 340/450.3 |
| 3,098,914 | 7/1963 | Giannino | 340/450.3 |
| 3,198,902 | 8/1965 | Deshautreaux | 200/87 |
| 3,200,645 | 8/1965 | Levins | 73/313 |
| 3,224,270 | 12/1965 | Karol et al. | 73/209 |
| 3,389,603 | 6/1968 | Jacobs | 73/308 |
| 3,473,381 | 10/1969 | Allen | 73/313 |
| 3,678,750 | 7/1972 | Dinoia et al. | 73/313 |
| 3,685,357 | 8/1972 | Alexander | 73/313 |
| 3,826,139 | 7/1974 | Bachman | 73/311 |
| 3,872,886 | 3/1975 | Shotmeyer | 137/558 |
| 3,916,691 | 11/1975 | Hollander et al. | 73/361 |
| 3,935,741 | 2/1976 | Zinsmeyer et al. | 73/313 |
| 3,976,963 | 8/1976 | Kubler | 335/206 |
| 4,056,979 | 11/1977 | Bongort et al. | 73/313 |
| 4,064,755 | 11/1977 | Bongort et al. | 73/313 |
| 4,084,436 | 4/1978 | Smitherman | 73/313 |
| 4,102,191 | 7/1978 | Harris | 73/313 |
| 4,184,370 | 1/1980 | Schlick et al. | 73/313 |
| 4,284,904 | 8/1981 | Tetro | 307/118 |
| 4,305,283 | 12/1981 | Redding | 73/290 |
| 4,361,835 | 11/1982 | Nagy | 340/624 |
| 4,384,184 | 5/1983 | Alvarez | 340/624 |
| 4,466,284 | 8/1984 | Dumery | 73/313 |
| 4,536,660 | 8/1985 | Tetro | 307/118 |
| 4,627,283 | 12/1986 | Nishida et al. | 73/313 |
| 4,628,162 | 12/1986 | Reinartz et al. | 340/624 |
| 4,730,491 | 3/1988 | Lew | 73/308 |
| 4,748,300 | 5/1988 | Anderson | 340/624 |
| 4,796,472 | 1/1989 | Lew | 73/308 |
| 4,805,066 | 2/1989 | Mergenthaler | 340/624 |
| 4,887,068 | 12/1989 | Umehara | 340/624 |
| 4,910,495 | 3/1990 | Sullivan | 340/450.3 |
| 4,955,231 | 9/1990 | Mahoney | 73/313 |
| 4,976,146 | 12/1990 | Senghaas et al. | 73/313 |
| 5,019,800 | 5/1991 | Gallert | 340/450.3 |
| 5,103,673 | 4/1992 | Sawada et al. | 73/311 |

FOREIGN PATENT DOCUMENTS

| | | | |
|---|---|---|---|
| 1497415 | 10/1967 | France | 73/DIG. 5 |
| 0420650 | 3/1967 | Switzerland | 73/311 |
| 0214127 | 6/1968 | U.S.S.R. | 73/311 |
| 2086576 | 5/1982 | United Kingdom | 73/311 |

Primary Examiner—Diego F. F. Gutierrez
Attorney, Agent, or Firm—Townsend and Townsend Khourie and Crew

[57] ABSTRACT

A dipstick for measuring oil levels provides an electronic indication when oil in an internal combustion engine sump is low or high. The electronic dipstick does not have to be removed as is normal for most dipsticks which determine level from observing a wet line on the stick. The dipstick has an elongated member for insertion into an aperture of a sump, the member has a high mark and a low mark thereon representing oil level in the sump. A float is mounted for movement within a cage integral with the elongated member, the float having a magnet to activate a switch. A first switch is associated with the high level and a second switch is associated with the low level. An indicating arrangement indicates when the magnet in the float activates either the first switch and/or the second switch.

8 Claims, 3 Drawing Sheets

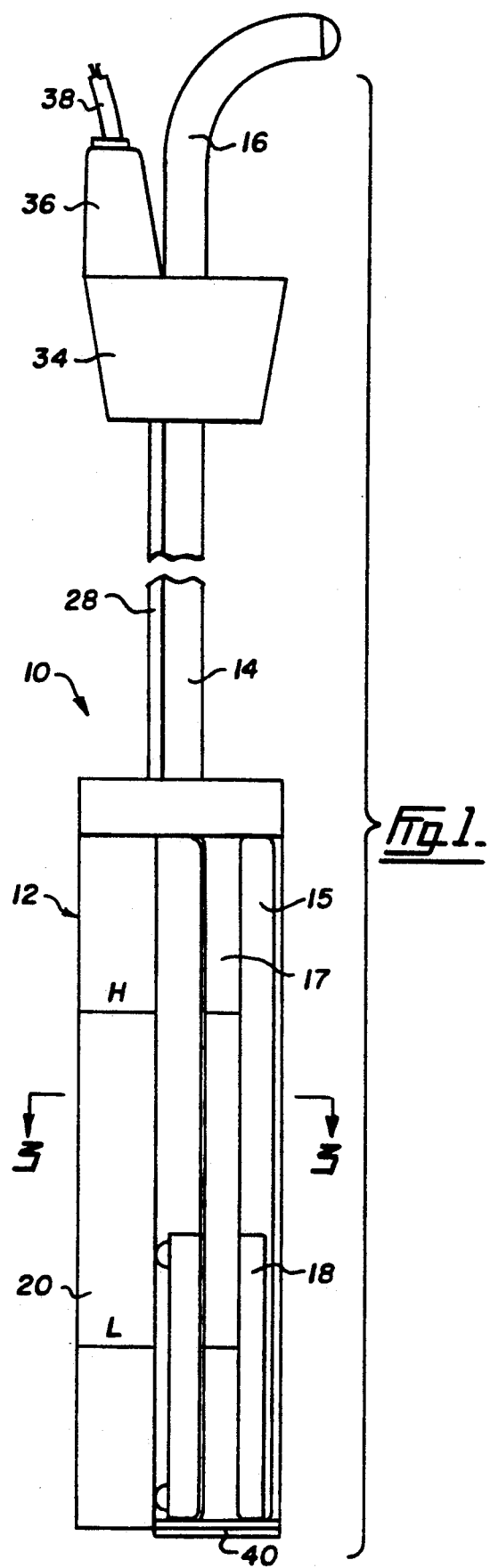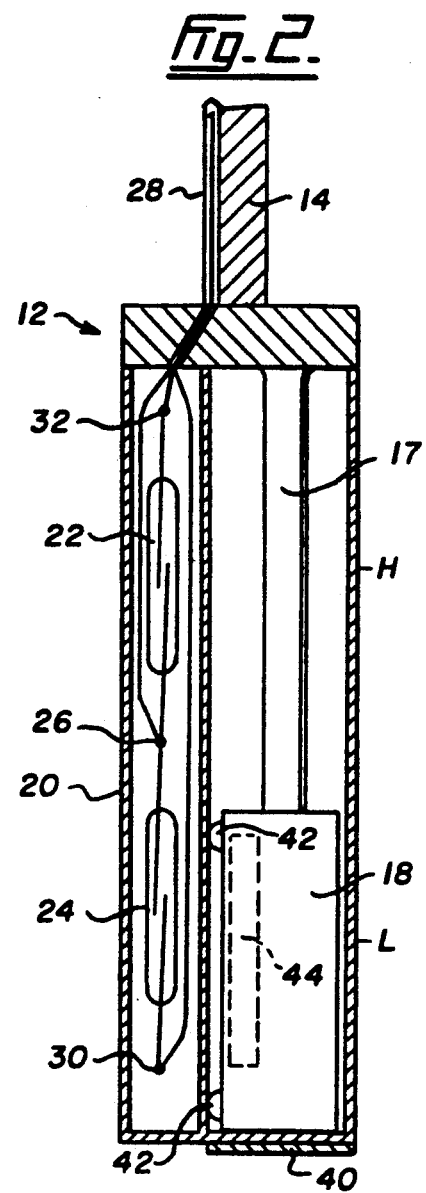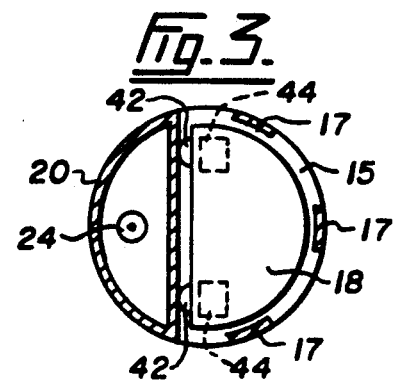

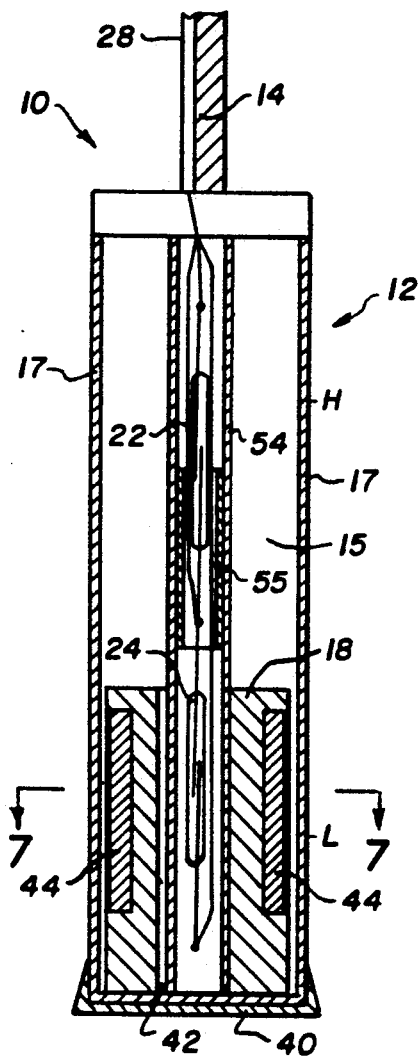
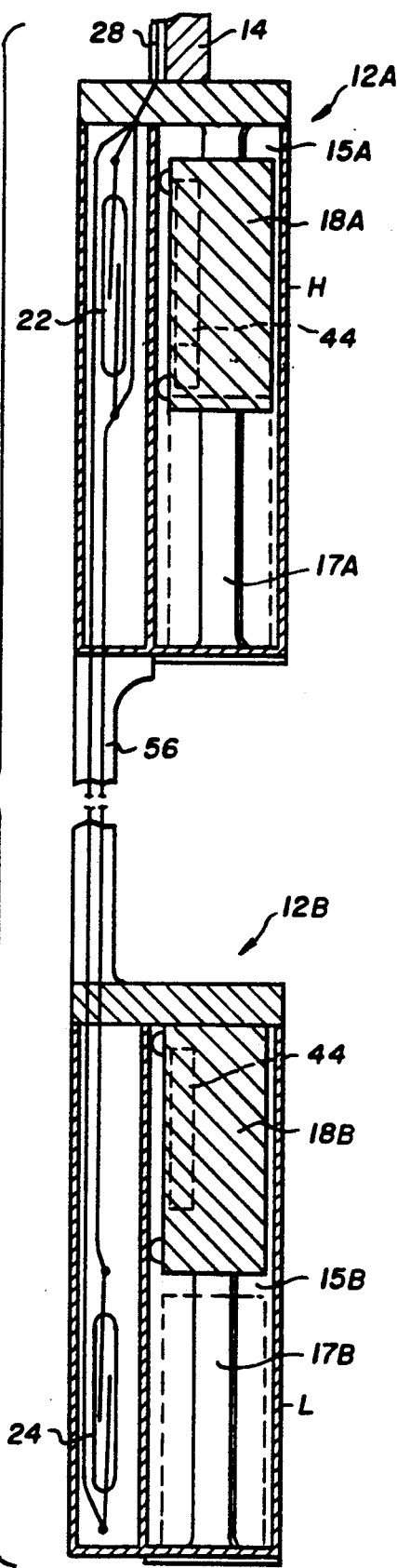
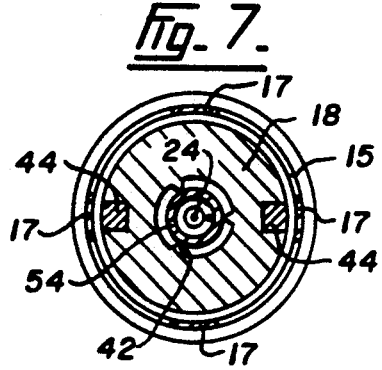

ELECTRONIC DIPSTICK FOR INDICATING THE OIL LEVEL OF AN ENGINE

TECHNICAL FIELD

The present invention relates to a dipstick for measuring oil level in the sump of an internal combustion engine. More specifically the present invention provides a dipstick that has an electronic indication when the oil level in the sump has dropped to a low level mark or below and when the oil level is at a high level mark or above.

BACKGROUND ART

Internal combustion engines whether gasoline or diesel, automotive, marine or stationary types rely on adequate lubricating oil supply for their operation. To monitor the level of lubricating oil in the sump of an internal combustion engine, a dipstick is used. This is manually withdrawn, wiped, reinserted withdrawn again and the wet line of the oil is observed.

As long as the wet line falls between a high level mark and a low level mark on the dipstick, the level is acceptable. When the oil level drops to the low level mark, the oil must be replenished.

Most internal combustion engines have an oil pressure switch which is activated when the oil level is low. Insufficient oil causes a low pressure and the switch provides a warning of this event. However, when this occurs the engine must be immediately stopped as the quantity of oil does not provide sufficient oil pressure to lubricate the engine.

The dipstick with a high mark and a low mark on it is the standard way to determine oil level in most vehicle engines and in marine engines. There is no automatic system available that indicates whether the oil level in the sump of an engine is at or below the low mark, between the low mark and the high mark or above the high mark.

Magnetically activated reed switches are known for determining liquid level. Some systems provide a continuous sensing level utilizing resistors and electronic circuits to provide a variable level indication.

DISCLOSURE OF INVENTION

It is an aim of the present invention to provide an electronic dipstick which may be inserted into a dipstick aperture of an engine sump and can be used to provide an electronic indication of the level of oil in the sump without having to remove the dipstick. The electronic dipstick has high and low marks thereon so it can also be used as a manual dipstick for back up situations. An electronic display may be located on the dipstick itself and a remote display may be provided, for example, on the dashboard of an automobile.

It is a further aim of the present invention to provide an electronic dipstick having limit switches that operate in the environment of an internal combustion engine sump, with high temperatures, extensive change in temperatures, vibration and abrupt movements as are normal for some types of vehicles that have internal combustion engines therein.

It is a further aim of the present invention to provide a fail safe backup to electronic low level sensing indication in a sump by allowing the dipstick to be used manually. A still further aim is to provide electronically an indication when the oil level in a sump is at the low level or below, when the oil level is between the low mark and the high mark and when the oil level is at the high mark or above it.

The present invention provides a dipstick for an engine sump comprising an elongated member for insertion into an appropriate aperture to the engine sump, the elongated member having a high mark and a low mark thereon indicating high oil level and low oil level in the engine sump, float means mounted for movement; a cage means integral with the elongated member, the float means indicating the oil level in the sump, the float means having switch activating means therein, a first switch means associated with the high oil level mark, the first switch activated when the float means is at or above the high oil level, a second switch means associated with the low oil level mark, the second switch means activated when the float means is at or below the low oil level, and indicating means to indicate the float means activates the first switch means or the second switch means.

BRIEF DESCRIPTION OF DRAWINGS

In drawings which illustrate embodiments of the present invention,

FIG. 1 is an elevational view showing one embodiment of the dipstick according to the present invention, FIG. 2 is a longitudinal sectional view showing the float and switch arrangement for the dipstick shown in FIG. 1, FIG. 3 is a cross-sectional view taken at line 3—3 of FIG. 1, FIG. 6 is a longitudinal sectional view showing another embodiment of a float and switch arrangement according to the present invention, FIG. 7 is cross-sectional view taken at line 7—7 of FIG. 6, FIG. 8 is a longitudinal sectional view showing a further embodiment with two floats and switches according to the present invention.

MODES FOR CARRYING OUT THE INVENTION

Figure 4:
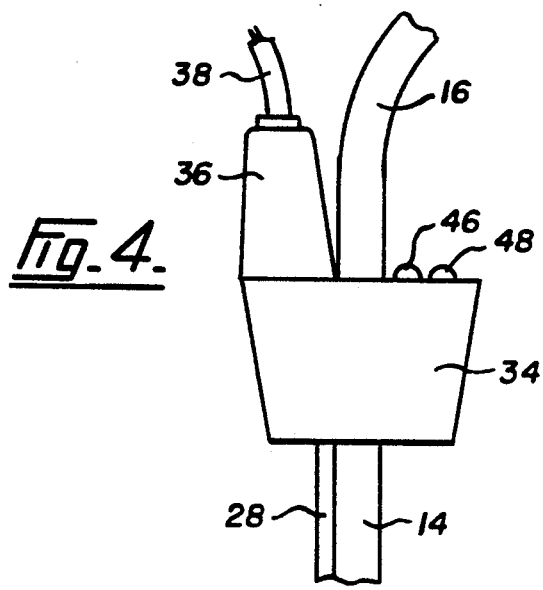
FIG. 4 is a partial elevational view showing another embodiment of a handle of a dipstick arrangement according to the present invention.

One embodiment of an electronic dipstick 10 is shown in FIGS. 1, 2 and 3. The Figures exaggerate the size of the switch and float housing for purposes of understanding. The switch and float housing 12 are shown attached to a flexible dipstick rod 14 with a handle 16 at the top for gripping the dipstick. The housing 12 has a cage 15 substantially semi-cylindrical in shape with three vertical strips 17 as shown in FIG. 3 into which fits a float 18 made of suitable material to float in oil. The float 18 is also substantially semi-cylindrical in shape having a substantially D-shaped cross section, although in a preferred embodiment the float is somewhat larger than semi-cylindrical and has a flat surface that is adjacent a circular segment member 20 forming part of the housing 12. The circular segment member 20 is sealed and has inside it a top reed switch 22 and a bottom reed switch 24. The top reed switch 22 and the bottom reed switch 24 are electrically connected together to form the common point 26 from which an electrical conductor is led upwards in a wireway 28 attached to the dipstick rod 14. The lower switch 24 and the upper switch 22 are connected at points 30 and 32 to electrical conductors which in turn are led through the wireway 28.

At the top of the dipstick rod 14 is a molded socket 34 for resting on a sump dipstick aperture. A three pin molded plug 36 fits into the molded socket 34 and has connecting cable 38 which is connected to a power supply such as the vehicle power supply.

At the bottom of the housing 12 is a removable base 40 that when removed allows the float 18 to fall out of the housing 12 for cleaning purposes. The float has four small hemispherical dimples 42 on the flat surface which rest against the flat surface of the circular segment member 20. The purpose of the dimples 42 is to minimize the force required to break the magnetic attraction acting between the reed switches 22,24 and the float 18 when the float is rising or descending with changes in oil level. The float 18 has good clearance in the cage 15 and therefore has no restriction to movement within the cage 15. Two permanent magnets 44 are positioned in the float. The magnets are oriented in the direction of movement of the float 18 with the reed switches 22 and 24 to ensure the appropriate switch closes when the float is in proximity to that switch. The two magnets 44 are located on each side of the switches 22 and 24.

The housing 12 has a high mark H and a low mark L on the exterior to indicate the high level of oil in the sump and low level of oil in the sump. When the dipstick is operated manually, the wet line of oil on the dipstick represents oil level. The low level switch 24 is arranged to be activated by the magnets 44 in the float 8 when the oil level is at or below the low level mark. When the oil level drops below the low level mark, the float 18 is arranged to stop at the bottom on the cage 4, thus the switch 24 remains activated for the complete time that the level of the oil is either on the low level line or below it.

The top switch 22 is arranged to be activated when the float 18 is positioned so that the oil is at the high level mark or above it. Again, when the float reaches the top of the cage, it stops, and the top switch 22 remains activated even if the oil level is higher.

The switches 22 and 24 detect two fixed positions, the low switch 24 is activated at the low oil level or below it and the high switch 22 is activated at the high oil level or above it. In between the high and low level marks, neither of the switches 22 and 24 are activated, thus you have an intermediate position when the oil level is between the two marks.

The entire housing unit is constructed of a non-magnetic material such as aluminum, stainless steel, brass, bronze, thermoplastic material or other suitable material, or combination of materials. The float is preferably made of an oil resistant plastic foam of appropriate specific gravity. The dipstick rod 14 is attached to the top of the housing either integrally molded together or joined in a permanent manner.

As shown in FIG. 4 one embodiment of the dipstick shows the molded socket 34 at the top of the dipstick rod 14 having two light emitting diodes 46 and 48 or lamps, one of which may be red and one may be green. The red light lights up when the low switch 24 is activated to show that the level of oil is level with or below the low mark on the dipstick, the green light comes on when the level of oil is at the high mark or above.

Figure 5:
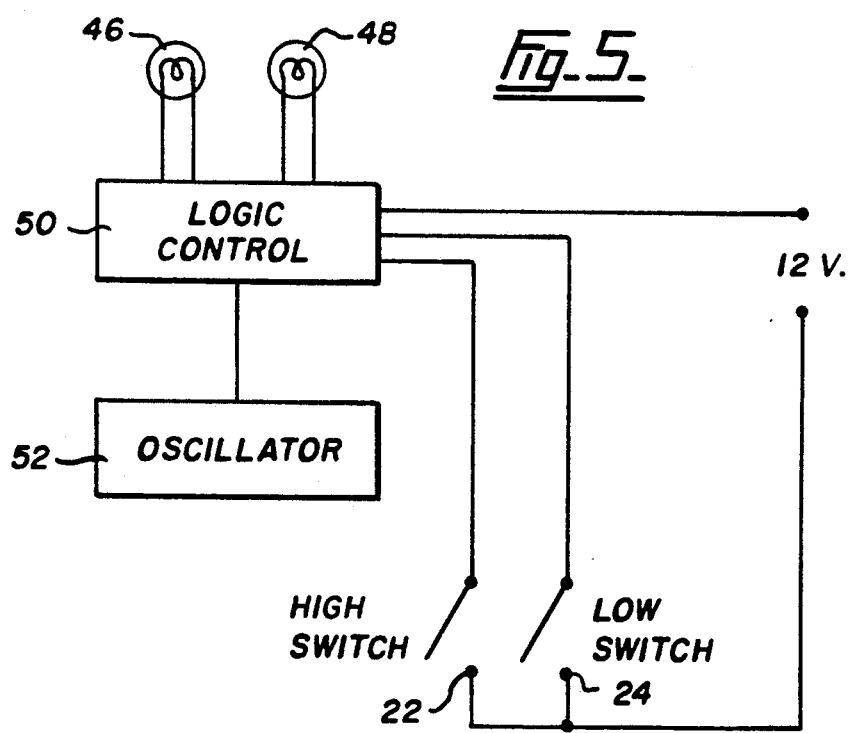
FIG. 5 is a block diagram showing one embodiment of an electronic circuit suitable for the present invention.

FIG. 5 shows in block diagrammatic form the electronics of the invention. High switch 22 and low switch 24 are connected to a logic control circuit 50 whose function is to control the high light 46 and low light 48 which at least in one embodiment, are red and green. The lights 46 and 48 may be light emitting diodes, incandescent lights or liquid crystal displays. In one embodiment, as shown in FIG. 3, the lights are located at the top of the dipstick, in another embodiment they are located on the dash of an automobile so the level of oil in the sump can be seen by the driver. An oscillator 52 provides a periodic on/off signal to the logic control for flashing when neither the high switch or the low switch 24 is activated. In operation, when the oil level is at or below the low level mark, the low switch 24 is activated and the low light 48 which is preferably a red light is on. This indicates that the sump should be replenished as oil is low. The second position is when the oil level is between the low mark and the high mark and in this case neither switch is activated and the oscillator 52 causes the logic control to flash the high light 46 which is preferably a green light. This occurs between the high and low level marks. When the oil level reaches the high level mark or higher, the high switch 22 is activated and the high light 46 which is in one embodiment the green light, comes on permanently.

In one embodiment, when the system is incorporated in an automobile or truck, the key in the ignition is placed in the ACC position or ON position and power is applied to the logic control circuit and dipstick. The lights 46 and 48 then indicate the position of the oil in the sump. In another embodiment a light on the dashboard of a vehicle indicates that the oil level is safe, that is to say, the oil level is not below the low level mark.

Another embodiment of a housing 12 is shown in FIGS. 6 and 7 wherein the float 18 has a hollow cylindrical shape and fits within a circular cage 15 formed of exterior strips 17 to hold the float 18 in place. The cage is open so the oil moves up and down, admitting the float 18 to rise and fall with the level of oil. A hollow centre tube 54 is hermetically sealed and contains the high switch 22 and the low switch 24. The wiring is similar to that shown in FIG. 2. Dimples 42 are provided on the inside surface of the float 18. The dimples 42 perform the same function as those shown in FIGS. 2 and 3 and reduce friction between the float 18 and the centre tube 54.

A magnetic shield in the form of a mild steel tube 55 is positioned within the hollow centre tube 54 and fixed thereto to prevent multiple switching of the high switch 22. The tube 55 is positioned so the switch 22 is not activated until the magnets 44 are above the tube 55. Magnetic shields of a different shape may also be incorporated into the embodiment shown in FIGS. 1, 2 and 3.

Yet another embodiment is shown in FIG. 8, specifically for internal combustion engines other than the automotive kind, whose sumps contain oil with a greater distance between high level and low level. In this embodiment two housings 12A and 12B are shown with an intermediate member 56 holding them apart similar to the dipstick rod 14. The configuration of each housing is similar to that shown in FIGS. 1, 2 and 3 except that the upper housing 12A has the high switch 22 therein and the lower housing 12B has the low switch 24 therein. A top float 18A with magnets 44 activates the high switch 2 and a bottom float 18B with magnets 44 activates the low switch 24. The wiring circuit is the same as that shown in FIG. 2 and FIG. 6.

In the embodiment shown the float 18B is positioned at the top of the cage 15B, therefore the low switch 24 is not activated. The top float 18A is shown at the top of the cage 15A, therefore the high switch 22 is activated. The oil level is therefore at the high level mark H or above. When the oil level drops to the low mark L, the float 18B in the bottom cage 15B drops and activates low switch 24. The electronic system is the same for this embodiment as that disclosed in the other two embodiments.

The intermediate member 56 shown in FIG. 8 is preferably flexible as is the dipstick rod 14 as many dipstick passageways are curved. Whereas the intermediate member 56 is shown at one side, it may also be placed in the axial centre of the housings similar to the dipstick rod 14. The cross-section of the housings 12A and 12B are such that they move downward through the dipstick passageway. In all cases the oil level may be measured in the normal way by simply pulling out the dipstick, wiping the dipstick, inserting it back into the dipstick passageway, then pulling it up again and measuring the wet line on the dipstick. The limited movement of the floats 18A and 18B is designed so that when the top float 18A is at the top or substantially at the top of the cage 15A, the high switch 22 is activated. If the oil level is higher than this, the switch 22A still remains activated. In the same way, when the oil level drops so that the lower float 18B is approaching the bottom of the cage 14b, the low switch 24 is activated. When the oil level drops below the low level L, the float 18B is retained in the bottom of the cage 15B, and the low switch 24 remains activated.

Various changes may be made to the embodiments shown without departing from the scope of the present invention. Whereas reed switches operated by permanent magnets are shown herein, it will be apparent to those skilled in the art that trip switches or limit switches might be used provided they are oil sealed and not affected by being immersed in oil. The trip switches operate in the environment of an engine sump taking into account the vibration, movement and temperature that occurs therein. Two magnets are shown in the embodiments, however, one magnet may be appropriate in certain types of floats, particularly when space becomes a problem. Other changes may be made without departing from the scope of the present invention which is limited only by the following claims.

The embodiments of the present invention in which an exclusive property or privilege is claimed are defined as follows:

1. A dipstick for an engine sump comprising:
    an elongated member for insertion into an appropriate aperture to the engine sump, the elongated member having high and low marks indicating a high oil level and a low oil level in the engine sump, respectively;
    float means mounted for restricted movement between the high oil level mark and the low oil level mark within a cage means integral with the elongated member, the cage means having an integral circular segment shaped portion at one side thereof and being closed at a top end and a bottom end, the float means having a substantially D-shaped cross section with a flat surface adjacent a flat surface of the circular segment shaped portion of the cage means, the float means having at least one permanent magnet therein as a switch activating means;
    a first reed switch associated with the high oil level mark, sealed within the circular segment shaped portion of the cage means, the first reed switch activated by the permanent magnet when the float means is at or above the high oil level mark;
    a second reed switch associated with the low oil level mark, sealed within the circular segment shaped portion of the cage means, the second reed switch activated by the permanent magnet when the float means is at or below the low oil level mark; and
    indicating means to indicate when the permanent magnet activates the first reed switch or the second reed switch.

2. The dipstick according to claim 1 wherein the elongated member is flexible.

3. The dipstick according to claim 1 wherein:
    the float means further comprises a top float, a bottom flat and a second permanent magnet;
    the cage means further comprises a top cage having the top float therein, the top float having the first permanent magnet therein to activate the first read switch, and a bottom cage having the bottom float therein, the bottom float having the second permanent magnet therein to activate the second reed switch.

4. The dipstick according to claim 1 wherein the indicating means includes light indicators on top of the dipstick to indicate high oil level and low oil level.

5. The dipstick according to claim 1 wherein the indicating means includes two light indicators, a first light indicator representing high oil level and the second light indicator representing low oil level, and including a logic control with oscillating means for causing the first light indicator to flash when the oil level is between the high mark and the low mark.

6. The dipstick according to claim 5 wherein: the first and second light indicators are located at a remote location from the cage means.

7. The dipstick according to claim 1 including magnet shield means positioned between the permanent magnet and the first reed switch to prevent activation of the first reed switch when the float means is below the high oil level mark.

8. The dipstick according to claim 1 including at least one magnetic shield positioned within the cage means to prevent multiple switching of the first reed switch and the second reed switch when the float means moves in the restricted movement within the cage means.

* * * * *